United States Patent [19]

Bendl et al.

[11] Patent Number: 4,727,467
[45] Date of Patent: Feb. 23, 1988

[54] PROCEDURE AND DEVICE TO OPERATE AN HVDC TRANSMISSION SHORT COUPLING IN THE EVENT OF POWER SYSTEM FAULTS

[75] Inventors: Franz-Wolfgang Bendl, Forth; Wolfgang Kaufhold, Erlangen; Georg Wild, Langensendelbach, all of Fed. Rep. of Germany

[73] Assignee: Siemens Aktiengesellschaft, Berlin and Munich, Fed. Rep. of Germany

[21] Appl. No.: 842,511

[22] Filed: Mar. 21, 1986

[30] Foreign Application Priority Data

Mar. 27, 1985 [DE] Fed. Rep. of Germany ....... 3511163

[51] Int. Cl.[4] .......................... H02J 3/36; H02H 7/10
[52] U.S. Cl. ........................................ 363/35; 363/51
[58] Field of Search ...................... 363/35, 51; 307/58, 307/84

[56] References Cited

U.S. PATENT DOCUMENTS

| | | | |
|---|---|---|---|
| 4,177,507 | 12/1979 | Leete | 363/51 |
| 4,320,444 | 3/1982 | Hausler et al. | 363/51 |
| 4,379,325 | 4/1983 | Krampe et al. | 363/51 |
| 4,475,150 | 10/1984 | d'Atre et al. | 363/51 |
| 4,516,198 | 5/1985 | Liss | 363/51 |
| 4,639,848 | 1/1987 | Sakai | 363/51 |

OTHER PUBLICATIONS

I.E.E. Proceedings, vol. 131, Part C, No. 4, Jul. 1984, "Combined Control and Protection System for Improved Performance of HVDC Links in the Presence of AC Faults", by Galanos et al.

I.E.E. Proceedings, vol. 127, Part C, No. 1, Jan. 1980, "Fault Studies in AC Systems Interconnected by HVDC Links", by Arrilaga et al.

Primary Examiner—William H. Beha, Jr.
Attorney, Agent, or Firm—Mark H. Jay

[57] ABSTRACT

Upon the occurrence of a change of an a.c. voltage amplitude of an a.c. power network line in one station A, a computing element generates a first pilot control variable by means of which the control angle of the respective static converter is shifted in terms of a reduction of its d.c. output voltage. In the other station a voltage correction regulator generates a correction variable by compensating the voltage drop in the HVDC transmission line, by means of which the control voltage of the respective static converter is corrected, which, for example, is generated by a pilot control voltage and the output signal of a marginal current or extinction angle regulator. Thus, even in case of an a.c. power network fault-induced voltage dip of the HVDC voltage, a preset value can be maintained for the HVDC current and the voltage dip in the power transmission be reduced. This procedure is independent of which station is operated as rectifier and which as inverter.

12 Claims, 7 Drawing Figures

PROCEDURE AND DEVICE TO OPERATE AN HVDC TRANSMISSION SHORT COUPLING IN THE EVENT OF POWER SYSTEM FAULTS

FIELD OF INVENTION

This invention relates to a procedure to operate a HVDC transmission short coupling in the event of a power system fault in one of two a.c. power networks, each of which is connected through one static converter to the d.c. transmission line.

BACKGROUND OF THE INVENTION

FIG. 1 shows a typical design of such a HVDC transmission short coupling, in which the two power networks NA and NB are each interconnected by a static converter SRA, SRB and the actual d.c. transmission line, with the HVDC transmission line in the simplest design consisting of a reactance coil L. Preceding each of the static converters on its respective a.c. current side is a static converter transformer whose transformation ratio can be adjusted by distinct steps $\Delta \ddot{u}A$ $\Delta \ddot{u}B$ in comparison to an average value. In actual situations often several individual converters are connected to the power network on the a.c. side through individual transformers and on the d.c. side connected in series to permit a higher-pulse operation of the respective static converter arrangement. To clarify the invention, however, the discussion will focus exclusively on the control of one static converter.

The valves of the static converters each receive from one control set STA or STB such ignition pulses that in the structure of the control arrangement depicted schematically in FIG. 1 static converter SRA draws a current from power network NA which can be controlled by the control voltage USTA (rectifier operation of static converter SRA in station A), while static converter SRB installed in station B functions as an inverter feeding power network NB, with the supplied power being controlled by its control voltage USTB in such a manner that a d.c. voltage UdB is maintained in the HVDC transmission line which can be measured by means of a voltage sensing device.

To generate the control voltage USTA, a set value Id* is provided by a central control unit STZ for the HVDC current Id measured by the measurement device, with its control differential being compensated by a current controller RIA. The output signal $\Delta \alpha A$ of the current controller could basically be directly used as the control voltage for the control set STA. As, however, by means of control voltage USTA primarily only the output voltage of static converter SRA is impressed and the d.c. current fed into the HVDC transmission line—in accordance with the inductive voltage drop at this coil—depends upon the differential of the d.c.-side connecting voltages of static converters SRA and SRB and thus the d.c. voltage UdB prevailing at the d.c.-side connection of static converter SRB functions as a disturbance variable, it is advantageous to connect this d.c. voltage UdB as a pilot control voltage to the controller output signal $\Delta \alpha A$ by means of a pilot control device VA in a positive feedback arrangement. Thus, the inductive voltage drop associated with the current set value Id* is eventually impressed by means of control voltage USTA so that the control of the current is independent of any change in UdB. Said type of pilot control is described in U.S. Pat. No. 4,648,018, which also provides for replacing the measured value UdB by a model value which can be calculated by the central control unit STZ using a control and computing element RZ from the current actual value Id, the amplitudes UA and UB of power networks NA and NB, the control angle or the extinction angle $\gamma B$ of station B and a parameter dx for the inductive voltage drop of the static converters.

Preferably, the pilot control unit VA comprises a linearizing circuit VLA which takes into account that the relationship $UdA = UA \cdot \cos \alpha A$ approximately prevails between the ignition angle $\alpha A$ of static converter SRA preset by the control voltage and the d.c.-side supply voltage which will be referred to below as UdA. Thus, if ignition angle $\alpha A$ is preset by the pilot control device VA directly as control voltage in accordance with $\alpha A = USTA = \arccos (\Delta A + UdB)/UA)$, then d.c. voltage $UdA = \Delta \alpha A + UdB$ is generated thereby. The controller output signal $\Delta \alpha A$ thus determines the voltage differential UdA-UdB and thus permits presetting the voltage drop in the HVDC transmission line as required for impressing the desired current.

The linearization can also be handled differently instead of utilizing an arc cos generator for the sum $\Delta \alpha A + UdB$. Thus, for example, voltage UdB can be converted into a rectifier pilot control angle $\alpha Gv = \arccos (UdB/UA)$, which then can be corrected by the control output signal $\Delta \alpha A$ in accordance with an ignition angle shift $\Delta A = \alpha Gv + \Delta \alpha A$. Below, the pilot control variable supplied to the pilot control device VA is designated as rectifier pilot control angle $\alpha Gv$ even if it does not yet have the dimension of an angle (e.g., the voltage UdB in FIG. 1), but is only connected within the pilot control device to form the control output signal $\Delta \alpha A$ so that the control angle $\Delta A$ is the sum of the pilot control angle given by the pilot control variable and an angle correction given by the controller output signal.

With respect to the static converter SRB functioning as an inverter, its d.c. voltage UdB depends upon the inverter control angle $\alpha B$ as derived from the amplitude UB of power network NB in accordance with the equation $UdB = UB \cdot \cos \alpha B$. The central control and computing element RZ of control unit STZ thus permits control of the HVDC transmission line voltage by presetting the inverter control angle.

When presetting the inverter control angle, attention has to be paid, however, that in the ignition cycle of the static converter valves when igniting a new valve, the current first has to be completely commuted from the valve to be extinguished and this valve to be extinguished must have attained its complete extinguished current level before its valve voltage becomes positive ("inverter threshold limit"). The phase position at which said current commutation is completed is designated as the extinction angle $\gamma$, and it is thus advantageous for controlling static converter SRB not to preset the ignition angle, but the extinction angle, which can be computed by the control and computing element RZ from preset nominal values for the HVDC power transmission.

Between the extinction angle and the inverter ignition angle to be supplied by the control voltage USTB, there is a phase shift designated as "overlapping angle" u which can be computed in advance, at least approximately, by the control and computing element RZ for each nominal extinction angle $\gamma^*$ in accordance with the instantaneous values of the HVDC transmission current Id and the power network amplitude UB. If then said precalculated overlap angle u along with the output signal $\Delta\alpha B$ of a $\gamma$ controller RGB is converted in a pilot control device VB to generate control voltage USTB, it is possible to regulate the static converter SRB to the desired d.c. voltage by means of an inverter control angle $\alpha B$. The pilot control variable determining the overlap angle u for said pilot control device VB is hereinafter designated as $\gamma Wv$; a separate linearizing element becomes partially unnecessary in this context and can be replaced in FIG. 1 by an amplifier for level adjustment. Here as well, however, the design of the pilot control device can be largely adjusted to the respective application.

In order that the central control until STZ can generate the set values $Id^*$, $\gamma^*$ and the pilot control signals $\alpha Wv$ and, if necessary, $\alpha Gv$, information regarding amplitudes UA, UB of power networks NA, NB and their properly functioning status is required, which is detected at a power network voltage control device NCT ("network monitor") whose function will be discussed later in greater detail.

FIG. 2 depicts the same HVDC transmission line with its static converters SRA, SRB, their transformers and control sets STA, STB, although here static converter SRA of station A is used as the inverter and static converter SRB of station B as the rectifier.

As may be seen, control set STB of static converter SRB functioning as the rectifier is now controlled by a current controller RIB and pilot-controlled by a pilot control signal $\alpha Gv$ which is detected either at the output d.c. voltage UdA of rectifier SRA or supplied as a model value by computing element RZ of the central computing network STZ.

The control voltage USTA for control set STA of static converter SRA functioning as inverter is now generated by an extinction-angle controller RGA assigned to station A and pilot-controlled by the inverter pilot control variable $\alpha Wv$. The inverter station is supplemented by a marginal current control which was omitted from FIG. 1 for inverter station B for clarity's sake and is not necessarily required for all HVDC transmission networks. Operating conditions can arise in which, due to the control of the power supply to the rectifier station, maintenance of the desired d.c. current is not attained and thus the HVDC transmission line is not fully utilized in terms of its power-transmission capacity.

In said instances it can be advantageous to cease controlling the HVDC transmission current in the inverter station by means of the extinction angle and rather to preset the control voltage USTA in such a fashion that the current supplied into the power network NA is changed by a shift of the inverter ignition angle to assure maintenance of a d.c. nominal value reduced by at least a small fraction ("marginal current" Imarg). For said purpose inverter station A also has a current regulator RIA which is supplied as its nominal value the value of the current regulator RIA and the output signal of the RID, reduced by the marginal current Imarg. The output of this additional current regulator RIA and the output signal of the pilot control device VA are supplied to a selector circuit ASA of station A.

As long as the d.c. current Id remains below the reduced set value $Id^*$-Imarg, the output signal of the current regulator RIA is effected and connected to the control line for USTA in order to increase the d.c. current Id by a change in the control angle. When the current controller RIA changes its polarity or the preset ignition angle defined by the extinction angle controller RGA and its pilot control device VA is attained, then the selector circuit ASA connects the output signal of said extinction angle controller with control line USTA, thereby disconnecting current controller RIA which comes against its stop since its controlled network has now been interrupted. Selector circuit ASA thus assures mutual replacement of controllers RIA and RGA in order to maintain at least the current $Id^*$-Imarg in the HVDC transmission line.

The type of operation of the HVDC transmission line explained thus far based on illustrations 1 and 2 requires, however, in both stations a three-phase network whose phase voltages each have approximately the preset nominal value for proper power network operation, or which are at least symmetrical. A voltage dip or a total collapse of one or two phase voltages produces, however, a non-symmetrical voltage network. While in the event of failure of one phase, the two other phases of a three-phase network could still transmit 66% of the rated power output, the value for d.c. transmission in the HVDC transmission line is substantially lower.

At the d.c. voltage output of the "faulty" static converter which has an operating malfunction, there is now a substantially lower average d.c. voltage. Moreover, the negative phase-sequence network now prevailing in the faulty power network generates transient control angle variants which also reduce the d.c. current. Thus, without any changes in the control parameters, the power output of the HVDC transmission line possible in comparison to the potential power output of the faulty power network is substantially reduced.

In the event of a power network fault on the rectifier side, the voltage dip of the HVDC transmission voltage can produce such a drastic d.c. current change that a total collapse of current flow in the HVDC transmission line results.

Said sudden change of the power output, however, disrupts the stability of the voltage in the non-malfunctioning power network as well.

SUMMARY OF THE INVENTION

It is an object of this invention to provide a procedure for operating a short coupling which at least for single-phase faults, which represent the largest statistical component in network faults, and also for two-phase faults does not interrupt the energy transmission, but instead maintains as large an energy transmission as possible under the conditions.

Briefly stated in accordance with one aspect of the invention, the aforementioned objective can be achieved by providing the following procedure for operating a high voltage direct current transmission short coupling between two multi-phase a.c. power networks in the event of a fault in one of the two a.c. power networks, each connected by a static converter to a d.c. transmission line portion of the HVDC transmission short coupling.

The deviation of the voltage amplitude from a preset nominal value, or more generally, the fault-generated change in the voltage amplitude is detected at the phases of the power network affected by the fault (preferably at each phase of the faulty power network) and converted to a first pilot control variable. Said first pilot control variable is preset so that the d.c. current which is normally determined by the current regulator of the rectifier station or by the marginal current regulator of the inverter station, can be held at a high value, e.g., the nominal current or a preset nominal current value Id*. Said first pilot control variable is connected to the control voltage of the "faulty" static converter connected to the faulty power network in such a fashion that the HVDC transmission line voltage is reduced. Simultaneously, by compensating the voltage difference at the d.c. voltage connections of the static converters, a second pilot control variable is obtained which is used as the pilot control variable for the control angle of the other— "properly functioning"—static converter. For example, the d.c. voltage of the faulty static converter, taking into account the d.c.-proportional voltage drop of the network, can be connected to the network as the set value and the output d.c. voltage of the properly functioning rectifier to a corrective voltage regulator as the actual value; then the corrective voltage regulator forms the second pilot control variable.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

To detect the occurrence of a power network fault, the amplitudes (or the RMS values by means of a corresponding measuring element) of the individual phase voltages are detected for each station using an absolute value element BB (FIG. 1), which are then checked in a threshold value stage SS to see whether they have fallen below a limit value $U_{limit}$. If one or more voltage amplitudes drop, a fault memory MS is set which for the duration of the fault issues a corresponding fault signal FA or FB indicating the power network fault of the respective faulty station. Below, FA=1 will designate the fault status of static converter SRA and FB=1 will designate the fault status of static converter SRB.

Figure 1:
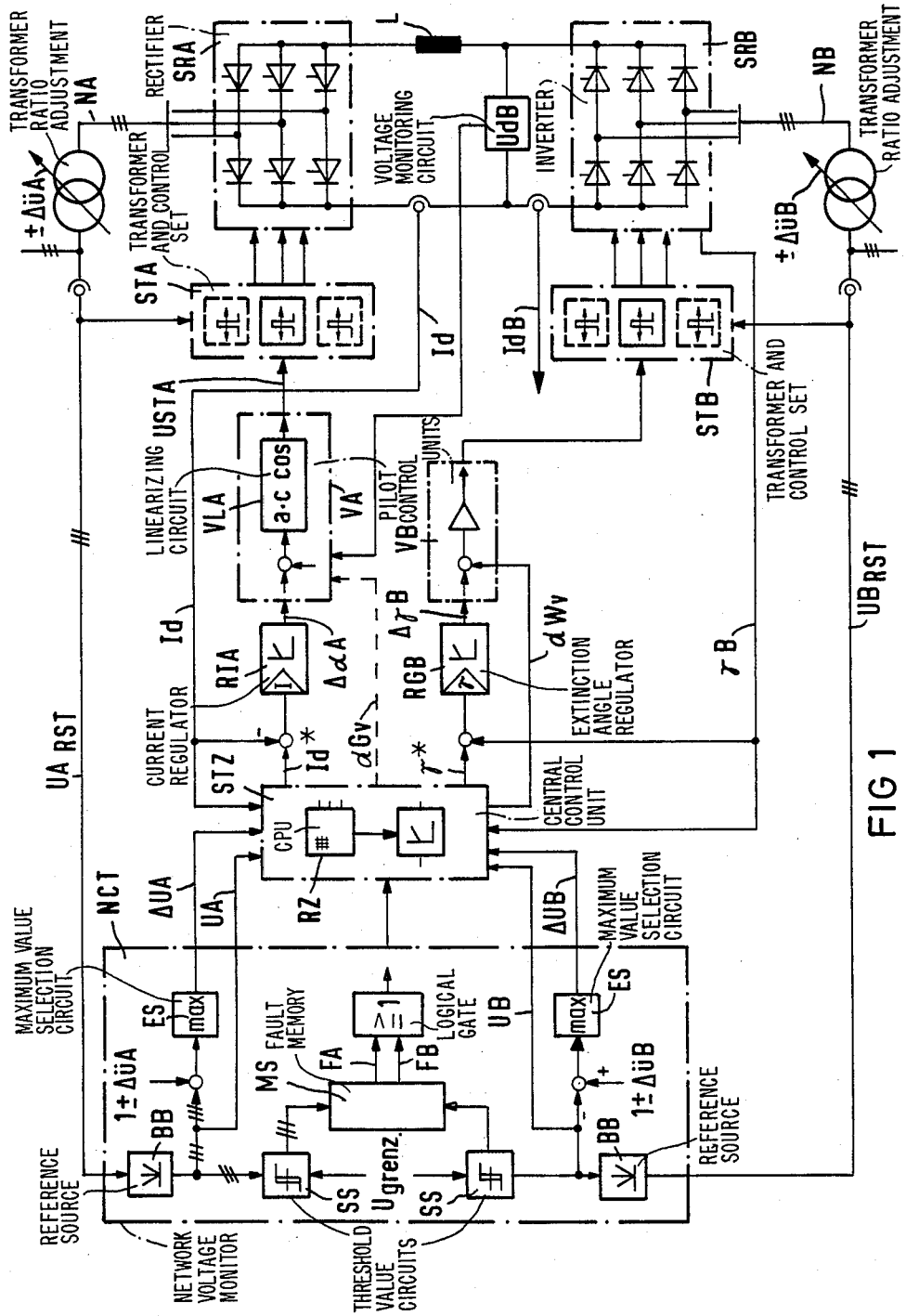
FIG. 1 diagrammatically shows the already described structure of the HVDC transmission line and of a power network monitor in the event of properly functioning power networks in an operating mode, wherein station A functions as the rectifier and station B as the inverter.

The power system monitor NCT shown in FIG. 1 generates, taking into account the transformation ratio $\Delta \ddot{u} A$ set at the static converter transformers, the deviation of the respective a.c.-side phase input voltage from the preset value which applies to the proper nominal status of the power systems and is designated as $1+/-\Delta \ddot{u} A$. The phase voltage with the least voltage amplitude, i.e., the greatest voltage dip, is selected by an extreme-value selector circuit ES (in case of FIG. 1, a maximal selection circuit) and determines the value $\Delta UA$ or $\Delta UB$ of the voltage change caused by the system fault, which needs to be taken into account. In the voltage monitor NCT shown in FIG. 2, first the lowest voltage change is selected from the amplitudes of the phase voltages by means of a minimal selection; then the change in the voltage amplitude is generated by comparing it with the nominal voltage corrected by the transformation ratio.

Figure 2:
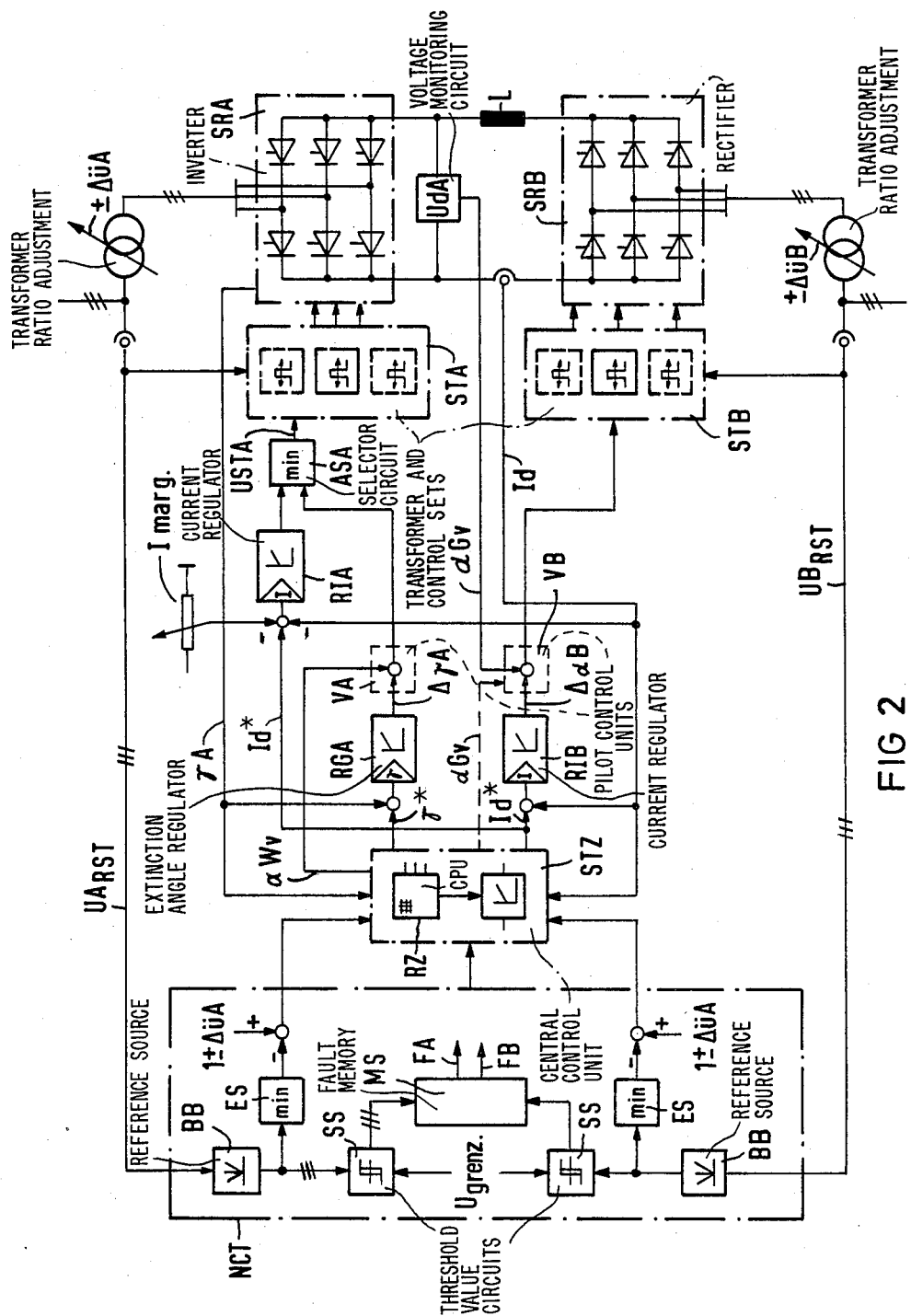
FIG. 2 diagrammatically shows the already described structure of the HVDC transmission line, with inverter operation in station A and rectifier operation in station B.
Figure 3:
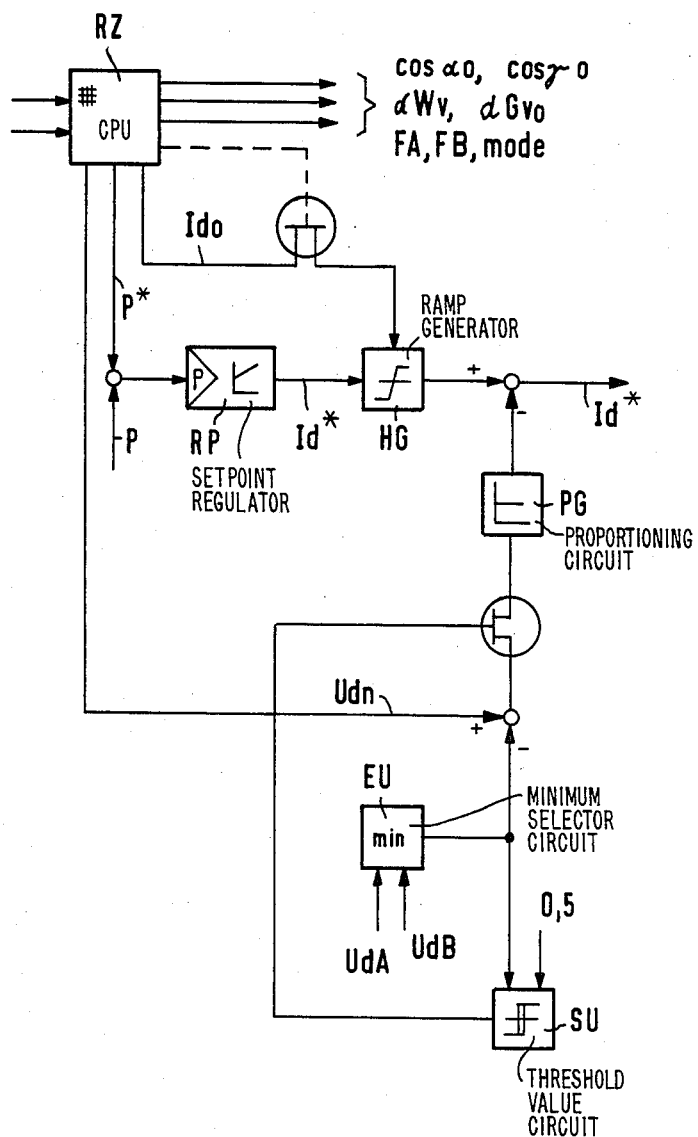
FIG. 3 shows a more detailed structure of the central control unit STZ of FIGS. 1 and 2.

The central control unit STZ shown in FIG. 3 is first set to the desired operating status by corresponding operating commands, e.g., the operating status shown in FIG. 1 with inverter operation in Station B and rectifier operation in station A corresponding to a status signal "mode"=1. Operation as per FIG. 2 thus corresponds to "mode"=0. This is provided for the case described in FIG. 7 in which both stations permit both rectifier as well as an inverter operation.

In the central control unit STZ, moreover, a set value P* preset for the operating status can be utilized for the output to be transmitted, which in conjunction with an actual value P generated in a suitable (not shown) fashion is supplied to a command variable controller RP to generate a preliminary set value Id**. Other command variables to generate the current set value can also be provided, which would result in another structure of the command variable control.

This preliminary d.c. set value Id is supplied, as shown in FIG. 3, to a ramp-function generator HG which, for example, following complete shutdown of the HVDC transmission line, serves to accelerate the current in accordance with a preset ramp function during re-start, as described in the above-mentioned U. S. Patent This ramp-function generator can be used, in particular, to limit the current set value to a value IdO preset for a situation during a power system fault (failure) indicated by the signal FA=1 and/or FB =1, which results in having the output controller come up against its stop due to the dip in the power actual value so that no higher current can flow over the static converter than permitted by the thyristors. In FIG. 3 this current limitation is achieved by having a value IdO stored in computing element RZ connected to the ramp-function generator HG by a corresponding switch triggered during the system fault, which then operates as a limit value for the ramp-function generator. As a result, the power controller RP which has reached its stop position is no longer operative so that in place of the preliminary current set value Id only the stored value IdO is preset.

If the HVDC transmission voltage, e.g., the minimal value of the HVDC transmission voltage selected by a minimal selector circuit EU at the output of both static converters, falls below a preset value of, for example, 0.5 times the nominal d.c. voltage, then it can be advantageous to maintain this limit value of the HVDC voltage at the expense of the declining HVDC current. For said purpose, attaining said threshold value is depicted in FIG. 3 by means of a threshold value element SU. By means of the output signal of said threshold value circuit, the differential between a voltage nominal value Udn stored in the computing element RZ and the HVDC voltage actual value supplied by the minimal selector circuit EU is transmitted by a semiconductor switch to a proportional element PG, which then reduces the limited current set value preset by the ramp function generator until such time as the preset limit value of the voltage builds up in the HVDC transmission line. The final current set value Id* generated in this fashion is then supplied to the current controllers RIA or RIB which are respectively in operation in the two stations as the set value.

The control and computing element RZ has, aside from storing the values P*, "mode," IdO and Udn associated with the respective preset operating status, also the task of generating the pilot control variables $\alpha Wv$ and $\alpha Gv$ associated with the respective operating status as described in the specified U. S. Patent. In addition, it also supplies a rectifier ignition angle control value $\alpha O$ or cos $\alpha O$ and an inverter ignition angle control value $\gamma O$ or cos $\alpha O$, which in the event of a system fault correct or replace the output signals $\Delta\alpha A$ and $\Delta\gamma v$ shown in FIG. 1.

Let us first examine the situation in which a malfunction occurs in the power system connected to the rectifier station, which in the situation shown in FIG. 1 would thus be a fault in the power system MA (i.e., FA=1).

Figure 4:
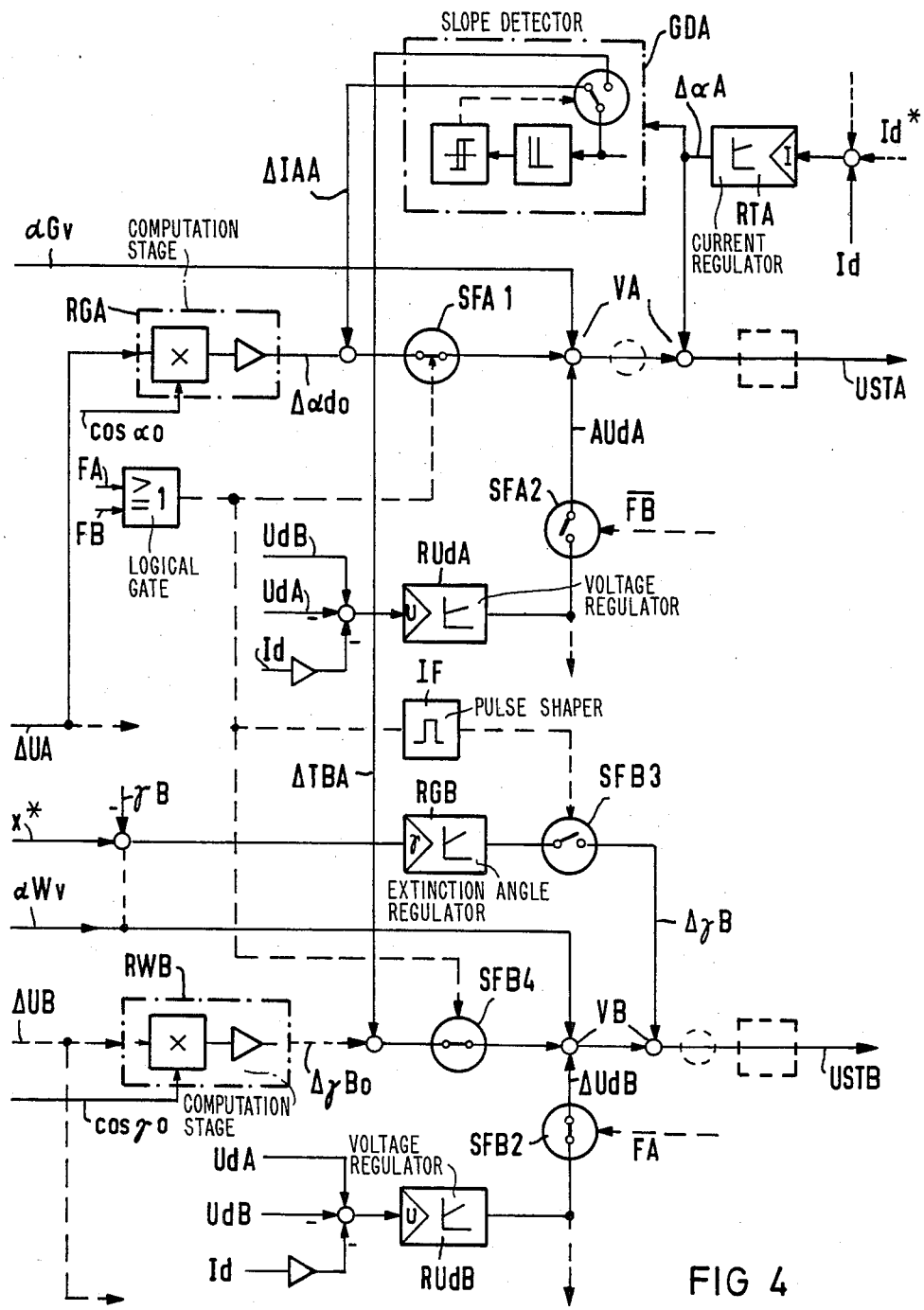
FIG. 4 shows parts of a preferred device to implement the procedure required in the event of a fault during operation as per FIG. 1.

As per FIG. 4, a rectifier pilot control variable $\Delta\alpha AO$ is generated from the fault-generated deviation $\Delta UA$ of the a.c. voltage amplitude in a computing element RGA assigned to rectifier station A in accordance with the already specified relationship $UdA = UA \cdot \cos\alpha$ by multiplication of the voltage deviation $\Delta UA$ with the preset rectifier ignition angle control variable Cos $\alpha O$ and suitable amplification in a post-amplifying unit. A switch SFA1, which is preferably designed as a transistor switch as are all the switches shown in FIG. 3 and all other switches utilized, is closed by a fault signal (FA, FB) which, for example, is generated via an OR gate from the individual fault signals FA and FB assigned to the respective power system; the switch then switches $\Delta\alpha AO$ onto the control voltage USTA which analogously to FIG. 1 during proper function of the system is generated from the pilot control variable $\alpha Gv$ and the output signal $\Delta\alpha A$ of current controller RIA.

While in normal operation (SFA1 open) the controller signal $\alpha\Delta A$ only minimally corrects pilot control angle $\alpha Gv$ (pilot control variable) and control angle $\alpha A$ of the rectifier is approximately the same as pilot control angle $\alpha Gv$, in case of a fault (SFA1 closed), i.e., by $\Delta\alpha AO$, the rectifier control angle is shifted so that the d.c. supply voltage of the rectifier is reduced in proportion to $\Delta UA$ (corresponding to the generation of $\Delta UA$, i.e., proportional to the maximum deviation of the voltage amplitudes of the phase voltages from the nominal value, as discussed in relation to the power system monitor NCT of FIG. 1 or 2).

Another pilot control variable $\Delta UdA$ obtained from a voltage correction controller RUdA is disconnected by another switch SFA2 which is only open in case of the occurrence of a fault in power system NB, i.e., with FB=1 and which is held in the shown open position by the inverse fault signal $\overline{FB}=0$.

Inverter station B also has a voltage correction regulator RUdB whose output signal is now connected via a corresponding switch SFB2 closed by the counter signal FA=1 to serve as the second pilot control variable $\Delta UdB$ of pilot control device VB of station B. The actual value of the d.c. supply voltage UdA of station A is connected to this correction regulator as the set value which is preferrably reduced by the voltage drop proportional to the d.c. current Id. The actual value of the d.c. supply voltage UdB of the inverter serves as the actual value. The voltage correction regulator RUdB thus controls the d.c. supply voltage of the inverter by means of the second pilot control variable $\Delta UdB$ acting on the inverter in such a fashion that the resetting of the HVDC transmission voltage effected by the first pilot control variable $\Delta\alpha AO$ in the rectifier is also properly taken into account during inverter operation.

Preferably, when a fault signal (FA, FB) occurs, a switch SFB3 is opened by means of a pulse shaper IF, by means of which the extinction angle regulator RGB of the inverter is blocked. The output signal $\Delta\alpha B$, which during normal operation involves only a slight correction of the inverter pilot control variable $\alpha Wv$, is thus disconnected. It is replaced by a corresponding signal $\Delta\alpha BO$ generated by a computing element RWB in accordance with the already specified relationship $UdB = UB \cdot \cos\gamma$ from the fault-generated deviation $\Delta UB$ of the voltage amplitude and the preset inverter extinction angle control signal Cos $\gamma O$ by multiplication and suitable amplification. The pulse shaper IF in this context would suitable include a timing element which would not reconnect the extinction angle regulator RGB until after elimination of the malfunction following a time lag.

FIG. 4 further shows a slope detector GBA which generates two correction variables $\Delta IAA$, $\Delta IBA$. The slight ignition angle correction by the output signal $\Delta\alpha A$ of current controller RIA can in fact remain switched on even during the power system fault. The output signal $\Delta\alpha A$ of current controller RIA then indicates whether in order to maintain the current set value Id* in case of a fault, a positive or a negative change of the actual value Id is required. If the slope of the signal $\Delta\alpha A$ is positive because the current controller requires more current, then a correction variable derived from $\Delta\alpha A$ can be connected to an input of the pilot control device VB to correct the control angle of the counterstation. If, conversely, the current controller needs to reduce the d.c. current and slope $d(\Delta\alpha A)/dt$ is negative, then a corresponding signal can be connected to an input of the pilot control device VA as a correction value for the ignition angle of its own rectifier station.

Figure 5:
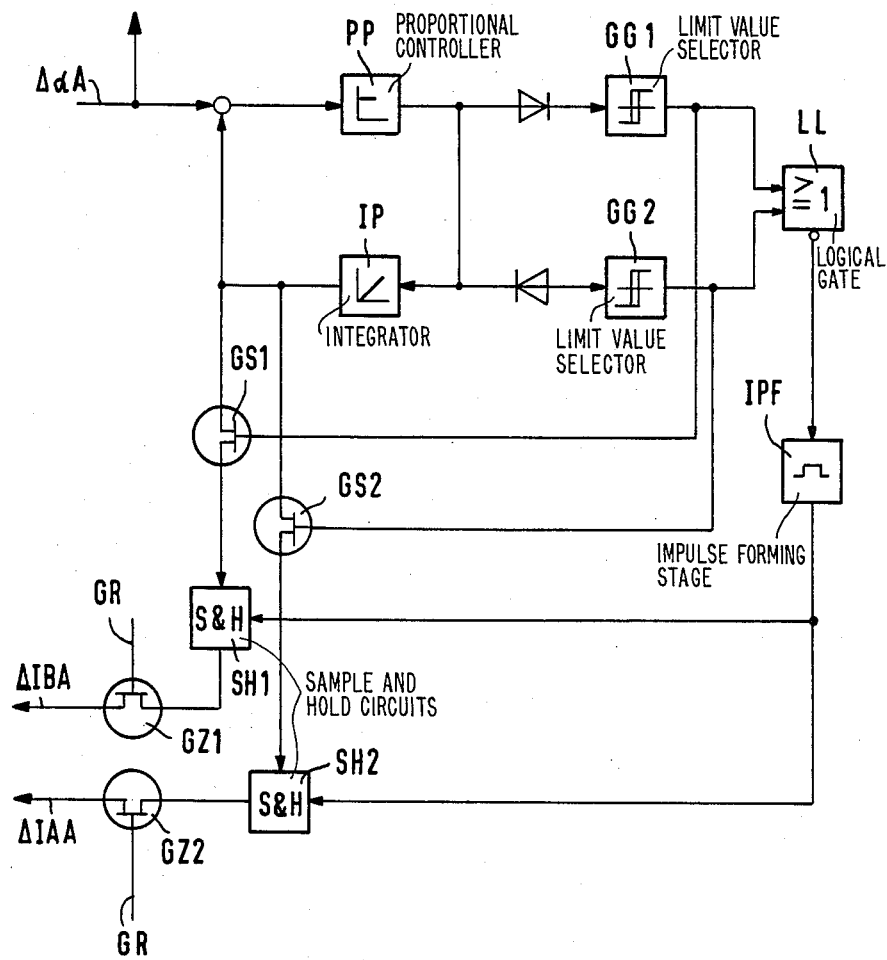
FIG. 5 shows a device to detect the slope of the current regulation output.

FIG. 5 shows the design of the slope detection GDA. A proportional regulator PP with an integrator IP in its feedback line provides the slope at its output which is then supplied to a polarity-separated limit value selector circuit. A positive slope thus results in triggering the limit value selector GG1 via a diode, whose output signal then closes a switch GS1 which connects the value $\Delta\alpha A$ (more precisely, the output signal of integrator IP) via a "sample-and-hold" circuit SH1 and a switch GZ1 which during rectifier operation of station A associated with current controller RIA is closed by a signal GR=1, to signal $\Delta IBA$ as a correction value of pilot control device VB.

Conversely, a negative slope leads to the triggering of limit value selector GG2 and to the closing of switch GS2 so that now the corresponding signal $\Delta IAA$ is connected to pilot control device VA by means of a sample-and-hold circuit SH2 and a corresponding switch GZ2.

If this correction results in the d.c. current attaining its set value Id so that the slope assumes the value 0, then both limit value selectors GG1 and GG2 drop off, releasing a pulse stage IPF by means of a logic gate LL. The pulse generated thereby results in having the triggered sample-and-hold circuit now store this value in accordance with the previously appearing polarity sign of the slope in order to make it available as the correction value of the respective pilot control device for the duration of power system fault.

FIG. 4 further shows in broken line other operative channels for $\Delta UA$ and $\Delta UB$ designed only for rectifier operation of station B and inverter operation of station A. Moreover, other switching elements are shown in broken line which in the previous operating status are closed and are not actuated until operation in accordance with FIG. 6 is applicable.

Figure 6:
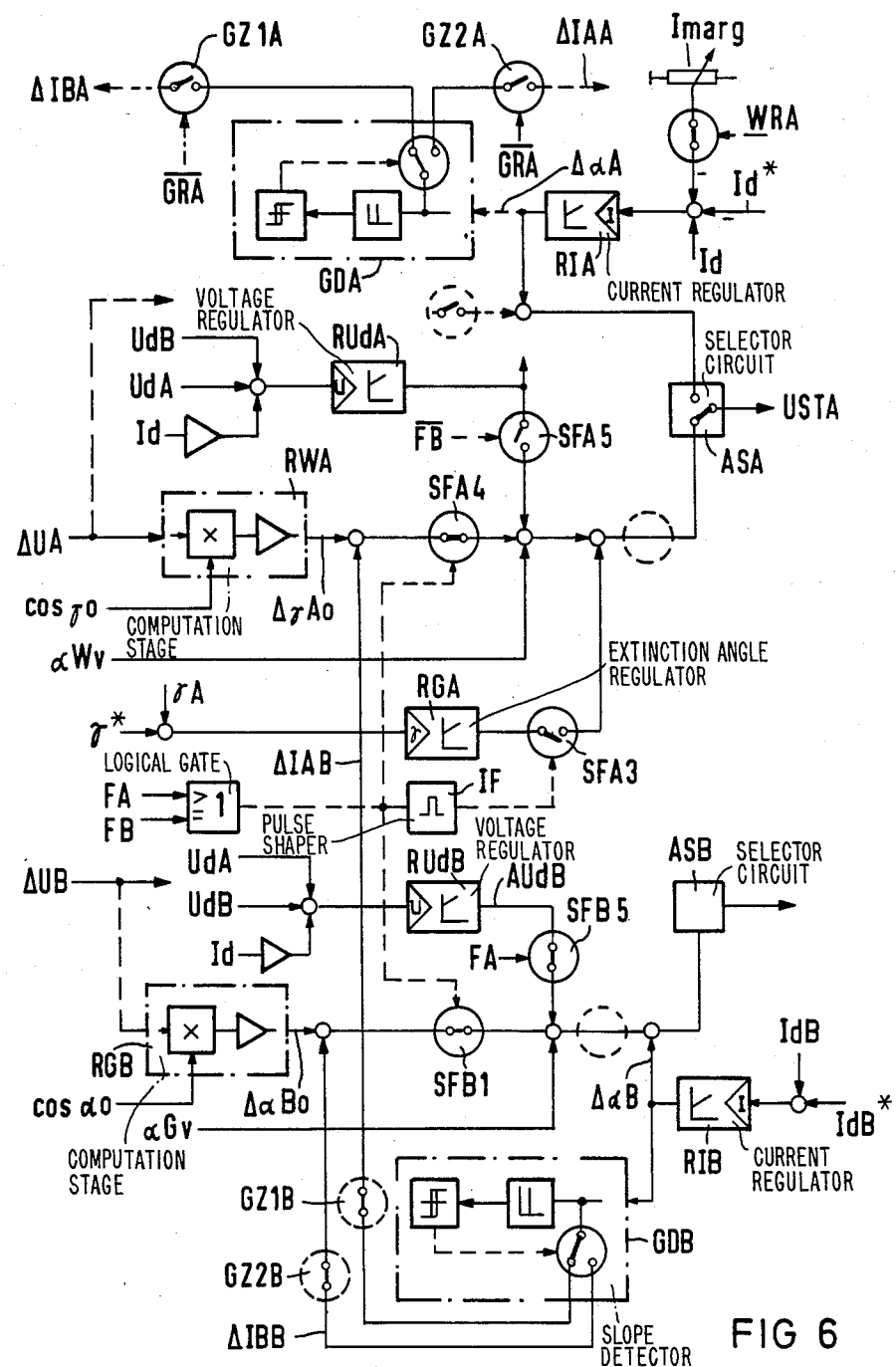
FIG. 6 shows those parts of a preferred device to perform the procedure which are required in the event of faulty operation in accordance with FIG. 2.

If namely station A is operated as the inverter station and station B as the rectifier station as shown in FIG. 2 and 6, then for each station those components are provided and in operation that were explained in FIG. 4 for the opposite station.

Thus, for example, in station A a computing element RWA (FIG. 6) generates from $\Delta UA$ and $\gamma O$ an inverter extinction angle pilot control variable $\Delta \gamma AO$. The fault signal $FA=1$ assigned to a voltage dip in power system NA now designates a fault in the power system connected to the inverter station. If switch SFA4 is closed throughout the duration of the fault, then by means of the inverter extinction angle pilot control variable $\Delta \gamma AO$ the inverter pilot control variable $\alpha Wv$ generated during proper operation as well will be corrected, while by means of a switch SFA3 the extinction angle control of RGA is inhibited and not released until after the fault has been eliminated following a time delay. Switch SFA5 closed only in case of a fault in the opposite power system B (fault signal $FB=1$) is opened in case of a fault in station A itself and thereby deactivates the voltage correction regulator RUDA. During inverter operation of station A (control signal $WRA=1$) current controller RIA receives as its set value the current set value $Id^*$ generated in accordance with FIG. 3, which, however, is reduced via the closed switch SFA6 by the preset marginal current Imarg. The extreme-value selector switch ASA executes the replacement of the extinction angle controller RGA by current controller RIA if the d.c. actual value Id drops below the set value $Id^*$ - Imarg preset by the marginal current control. As long as the selector circuit ASA keeps the extinction angle regulator IGA live and opens the controlled system of current regulator RIA, the current controller output signal $\Delta \alpha A$ has practically reached its extreme value and the slope detector GDA is not triggered. As this corresponds to the normal inverter operation, the marginal current control designed for station B operating in FIG. 4 as an inverter and having a corresponding current controller RIB and a selector circuit ASB is not shown. If, however, the current controller RIA shown in FIG. 6 for station A is live so that slope detector GDA is triggered, then its output signals $\alpha IBA$ and $\Delta IAA$ are blocked in their open position shown in FIG. 6 in accordance with control signal $GRA=0$ or $\overline{GRA}=1$ by switches GZ1A, GZ2A corresponding to switches GZ1, GZ2 (FIG. 5).

In the case shown in FIG. 6 of an inverter fault and rectifier operation of station B, a voltage correction regulator RUdB now supplies signal $\Delta UdB$ as the second pilot control variable which is utilized for correction of the rectifier pilot control variable $\alpha Gv$ using switch SFB5 closed by trigger signal $FA=1$. Said correction variable in its turn is pilot-controlled—with switch SFB1 closed—with the value $\Delta \alpha BO$ generated by the computing element RGB in accordance with the product of $\Delta UB$ and $\cos \alpha O$.

In the fashion already described in conjunction with FIG. 5, the slope detector GDB now generates the signal $\Delta IBB$ derived from current controller IBB which is used for correcting the control voltage of its own station B and the corresponding signal $\Delta IAB$ used to correct the control voltage of the opposite station in accordance with the respective polarity sign of the detected slope. The switches GZ1B, GZ2B located at the output of said signals are closed during the rectifier operation at station B being under consideration.

Figure 7:
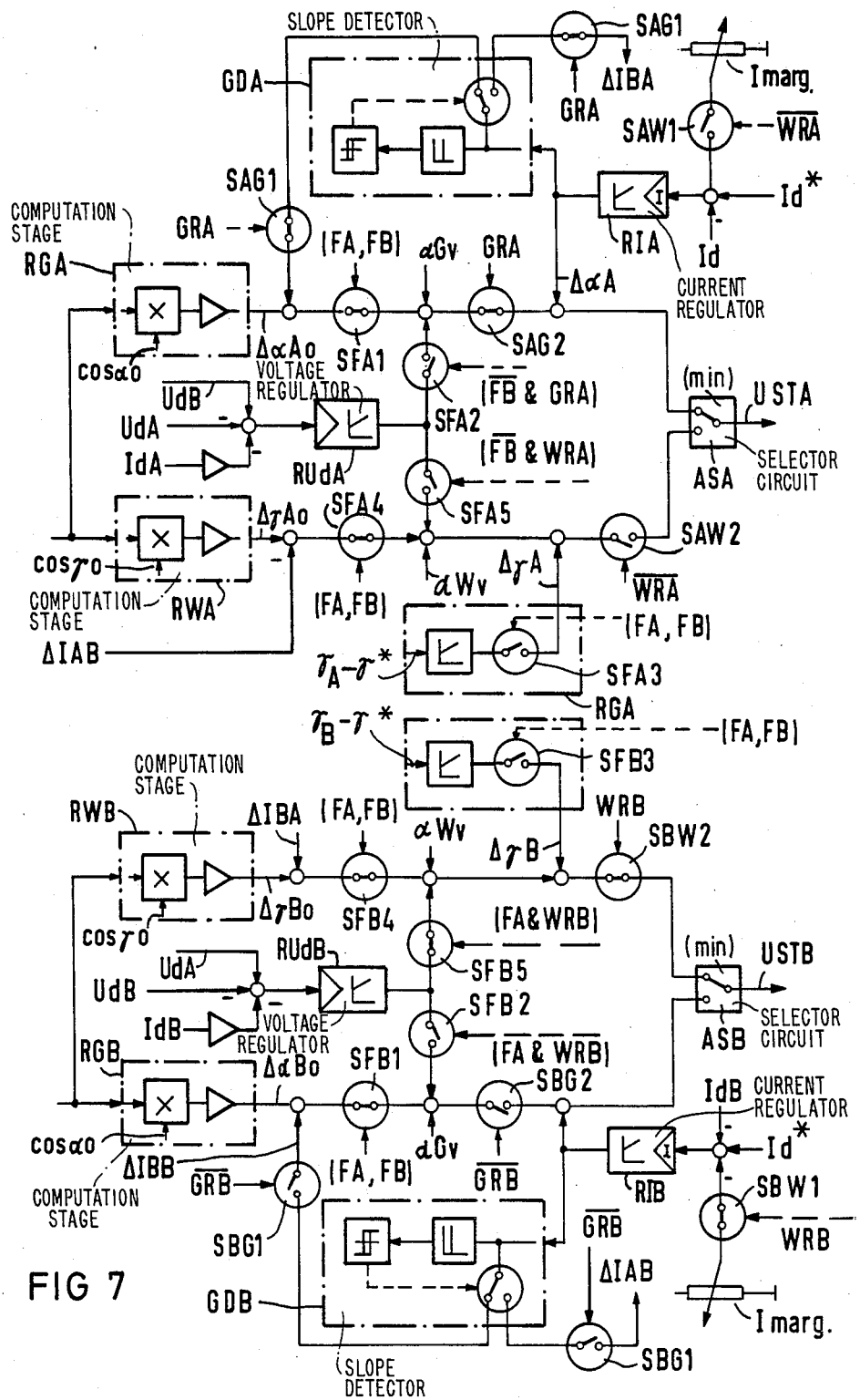
FIG. 7 summarizes the parts shown in FIGS. 4 and 6.

If the role of each static converter as rectifier or inverter is determined by the system, then to execute the procedure defined by this invention the control elements specified in FIGS. 4 and 6 are the maximum required in each instance. In the preferred embodiment of the invention, however, by means of a status signal "mode" one can switch between rectifier operation mode in station A and inverter operation in station B (FIGS. 1 and 4) and rectifier operation mode in station B and inverter operation mode in station A (FIGS. 2 and 6). For said purpose all that is required is to supplement the components shown in FIG. 4 by the components shown in FIG. 6 in order to maintain the control sequence required both for inverter and rectifier operation in each station. Suitable switches will only activate the control sequence corresponding to the respective operating mode. Said arrangement is shown in FIG. 7.

In status "1" of the specified control signal, the switches are closed, whereby "mode"=1 controls rectifier operation of station A with the control signals $GRA=1$, $WRA=0$ and the inverse signals $\overline{GRA}=0$, $\overline{WRA}=1$ and rectifier operation of station B with $WRB=1$, $GRB=0$ or $\overline{WRB}=0$, $\overline{GRB}=1$. The other operating status "mode"=0 designates rectifier operation in station B and inverter operation in station A, i.e., $GRA=\overline{WRA}=\overline{GRA}=WRB=0$.

In each specific station the respective current controller is switched on in both modes of operation, though in inverter operation (switch SAW or SBW closed) it functions as a marginal current controller while disconnecting the rectifier pilot control variable (switch SAG2 or SBG2 open) connected to one input of a selector circuit (ASA or ASB) whose other input is connected to the inverter control change (switch SAW2 or SBW2 closed) activated by the extinction angle regulator output variable ($\Delta \gamma A$ or $\Delta \gamma B$).

When switching over to rectifier operation of said station, opening switch SAW2 or SBW2 disconnects the entire inverter control sequence at the input of the selector switch circuit and the current controller— which by the opening of switch SAW1 or SBW1 no longer functions in marginal current operation—the rectifier pilot control variable (switch SAG2 or SBG2) and in case of a fault (switch SFA1 or SFB1 closed) also the rectifier ignition angle control variable ($\Delta \alpha Ao$ or $\Delta \gamma Ao$) are connected to the control voltage.

Each control chain in each station shares a voltage correction regulator (RUdA or RUdB), which by means of switches SFA2 and SFA5 (Station A) or SFB2 and SFB5 can affect only the inverter or rectifier control chain of the control voltage operating at the time. The status signal corresponding to the respective mode of operation controls said switches by means of an AND circuit with the fault signal indicating the failure of the opposite station in such a fashion that the voltage correction regulator corrects the control voltage of said station only in case of a fault of the opposite station.

Accordingly, the switch positions of FIG. 7 depict rectifier operation of station A, inverter operation of station B, a rectifier-side power system fault and a disconnected marginal current control in the inverter station (B).

FIGS. 1 and 2 show in the circuitry of control sets STA, STB that it is preferable if the valves operating on separate phases of the respective static converter are ignited by separate control sets, thus permitting in case of a non-symmetrical failure the ignition pulses to be synchronized to the non-symmetrical phase voltages. It could even be necessary to generate a separate control voltage to control the valves working respectively on one phase of the faulty a.c.-voltage power network. To generate the pilot control variables and control voltages, microcomputers, in particular, are installed in each station.

Overall, this invention assures that despite the d.c. voltage dip caused by the system fault, a high d.c. current is maintained in the HVDC transmission line so that overall the fault-induced reduction of the transmitted power can be limited.

It will now be understood that there has been disclosed an improved procedure for operating an HVDC short coupling during faults. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured as Letters Patent of the United States is:

1. procedure for operating a HVDC transmission short coupling between two multi-phase a.c. power networks in the event of fault in one of the two a.c. power networks each connected by a static converter to a d.c. transmission line portion of the HVDC transmission short coupling comprising the steps of:
    detecting a fault-included voltage amplitude change, at the at least one phase of the power network which is malfunctioning due to a network fault and converting the fault induced voltage to a first pilot control variable;
    reducing a HVDC voltage under control of a converter control variable, said control variable being a voltage reference value and comprising the sum of said first pilot control variable and a first control voltage of the static converter connected to the faulty power network; and
    obtaining a second pilot control variable for a second control voltage controlling the other static converter and compensating the voltage difference at the connection points of the d.c. transmission line to the static converter in dependence upon said voltage difference.

2. A procedure according to claim 1, further comprising the steps of:
    detecting at each phase of the faulty power system a deviation of the voltage amplitude from a preset nominal value;
    selecting the maximum deviation; and
    determining the first pilot control variable, as a function of maximum deviation.

3. A procedure according to claim 1, further comprising the steps of presetting as a reference value a d.c. voltage at the malfunctioning static converter terminal reduced by a d.c. proportional voltage drop, and as an instantaneous value a d.c. current at the non-malfunctioning static converter terminals for compensation of the voltage difference.

4. A procedure according to claim 1, further comprising the step of generating the first pilot control variable by multiplication of the voltage change with the cosine of a preset rectifier control angle in rectifier operation and a preset inverter control angle in case of inverter operation.

5. A procedure according to claim 1, further comprising the step of detecting a RMS voltage value detected as the voltage amplitude.

6. Procedure according to claim 1, further comprising the step of holding the HVDC voltage to a limit value by a reduction of the HVDC transmission line current, in case the HVDC voltage drops to a preset limit value.

7. A procedure according to claim 1, further comprising the steps of:
    controlling the HVDC transmission line current by a current controller working on the static converter operating as a rectifier; generating, in case of a power network fault, a signal derived from a control deviation of the HVDC current, and when the values of the HVDC current fall below the HVDC current set value, connecting it with the control voltage of the static converter operating as the inverter and in case of an instantaneous value exceeding the reference value, connecting it with a control voltage of the static converter operating as a rectifier in a corrective fashion.

8. A procedure according to claim 7, further comprising the steps of:
    determining a first corrective variable, at an output of said current controller, for the control voltage of the rectifier as well as the polarity of the difference between the current reference value and the current instantaneous value derived from a time function of the current controller output signal, as well as a second corrective variable, generated from said current controller output signal, and by having the second corrective variable connected to the control voltage of either the static converter operating as the rectifier or the static converter operating as the inverter in accordance with the polarity generated.

9. A procedure according to claim 1, further comprising the step of generating a reference value, of the HVDC current during proper operation by an power controller which is inhibited throughout the fault and not released until after the malfunction has been remedied.

10. A procedure according to claim 8, further comprising the step of inhibiting the power controller throughout the duration of the fault by limiting the reference value, to a value, corresponding to the current-carrying capacity of the static converter valves.

11. A procedure according to claim 1, further comprising the step of determining the control voltage of the inverter during proper functioning by an extinction angle controller which is locked during the duration of the fault and not released until after a time lag following the elimination of the fault.

12. A procedure according to claim 1, further comprising the step of generating converter valve ignition pulses separately by means of individual control sets for the valves operating on the individual phases of the malfunctioning power network.

* * * * *